US008838279B2

(12) United States Patent
Blackwell et al.

(10) Patent No.: US 8,838,279 B2
(45) Date of Patent: Sep. 16, 2014

(54) ALTERNATIVE POWER OPERATION OF LOADING DOCKS AND LOADING DOCK EQUIPMENT (75) Inventors: Benjamin I. Blackwell, Flower Mound, TX (US); Brett A. Walford, Corinth, TX (US); Lowell Blake Whitley, Arlington, TX (US); Michael Story, Denton, TX (US); Allan Thomson, Colleyville, TX (US)

(73) Assignee: 4Front Engineered Solutions, Inc., Carrollton, TX (US)

( * ) Notice: Subject to any disclaimer, the term of this patent is extended or adjusted under 35 U.S.C. 154(b) by 475 days.

(21) Appl. No.: 13/130,989

(22) PCT Filed: Dec. 16, 2009

(86) PCT No.: PCT/US2009/068306
§ 371 (c)(1),
(2), (4) Date: Jun. 10, 2011

(87) PCT Pub. No.: WO2010/077977
PCT Pub. Date: Jul. 8, 2010

(65) Prior Publication Data
US 2011/0238231 A1 Sep. 29, 2011

Related U.S. Application Data (60) Provisional application No. 61/138,282, filed on Dec. 17, 2008, provisional application No. 61/212,980, filed on Apr. 17, 2009.

(51) Int. Cl.
G06F 19/00 (2011.01)
B65G 69/28 (2006.01)
H02J 9/06 (2006.01)

(52) U.S. Cl.
CPC ............ *B65G 69/2882* (2013.01); *H02J 9/06* (2013.01)

USPC .......................................... 700/286; 340/687

(58) Field of Classification Search
USPC ...................... 700/286; 180/65.24; 340/687
See application file for complete search history.

(56) References Cited

U.S. PATENT DOCUMENTS

| 4,009,051 A | 2/1977 | Kazis et al. |
| 4,286,911 A | 9/1981 | Benjamin |

(Continued)

FOREIGN PATENT DOCUMENTS

| WO | WO-2008036087 A1 | 3/2008 |
| WO | WO-2010077977 A1 | 7/2010 |

OTHER PUBLICATIONS

Dock Lighting Goes Green with the FT Ultra LED Docklight:, APS Resource, News Release, Dec. 2008 1 page.

(Continued)

*Primary Examiner* — Kidest Bahta
(74) *Attorney, Agent, or Firm* — Perkins Coie LLP (57) ABSTRACT

Technology generally directed to operation of loading dock equipment such as vehicle restraints, dock levelers, overhead doors/openers, barrier gates, lights, and linked or unlinked control systems is disclosed herein. The disclosed technology may be employed to power electrical loading dock systems from batteries and/or alternative power sources, including "green" power sources. For example, the technology may be employed at new, temporary, and/or mobile facilities having any number of loading docks where reliable commercial power may not be readily available. Further, the technology may also be employed at warehouses in remote and/or developing areas where electrical infrastructure is not available and/or reasonably priced. The technology may be embodied as methods, apparatuses, manufactures (e.g., computer- and/or processor-readable storage and/or other mediums), and/or the like.

31 Claims, 3 Drawing Sheets

(56) References Cited

U.S. PATENT DOCUMENTS

| | | | |
|---|---|---|---|
| 4,476,853 A | | 10/1984 | Arbogast |
| 4,626,983 A | | 12/1986 | Harada et al. |
| 4,661,758 A | | 4/1987 | Whittaker |
| 4,744,121 A | | 5/1988 | Swessel et al. |
| 5,323,098 A | * | 6/1994 | Hamaguchi et al. .......... 320/109 |
| 5,576,533 A | | 11/1996 | Tantraporn |
| 5,775,107 A | | 7/1998 | Sparkman |
| 5,831,540 A | * | 11/1998 | Sullivan et al. ............... 340/679 |
| 5,886,863 A | * | 3/1999 | Nagasaki et al. ............. 361/234 |
| 5,886,883 A | * | 3/1999 | Rail ................................ 363/39 |
| 5,898,585 A | | 4/1999 | Sirichote et al. |
| 6,367,259 B1 | | 4/2002 | Timm |
| 6,369,462 B1 | | 4/2002 | Siri |
| 6,476,572 B2 | * | 11/2002 | Lounsbury .................... 318/139 |
| 6,543,375 B1 | | 4/2003 | Sargent et al. |
| 6,787,259 B2 | | 9/2004 | Colborn et al. |
| 6,810,817 B1 | | 11/2004 | James |
| 6,812,849 B1 | * | 11/2004 | Ancel .......................... 340/686.1 |
| 6,917,298 B2 | | 7/2005 | Romano et al. |
| 7,101,064 B2 | * | 9/2006 | Ancel ........................... 362/427 |
| 7,162,762 B1 | | 1/2007 | Gleason |
| 7,230,819 B2 | | 6/2007 | Muchow et al. |
| 7,256,703 B2 | | 8/2007 | Duvernell et al. |
| 7,274,300 B2 | | 9/2007 | Duvernell et al. |
| 7,823,239 B2 | * | 11/2010 | Hochstein et al. ............. 14/69.5 |
| 2002/0140390 A1 | * | 10/2002 | Lounsbury .................... 318/560 |
| 2007/0090808 A1 | * | 4/2007 | McCabe et al. ............... 320/137 |
| 2007/0157614 A1 | | 7/2007 | Goldman |
| 2007/0283806 A1 | | 12/2007 | Morrison |
| 2008/0011799 A1 | | 1/2008 | Chang |
| 2008/0143290 A1 | | 6/2008 | Chavakula |

OTHER PUBLICATIONS

APS&GO—LED Communication System Specification Sheet, APS Resource, for APS1102, Nov. 2009, 2 pages.
Energy Saving Products Brochure, APS Resource, Mar. 2009, 4 pages.
FT Ultra LED Docklight Literature Sheet, APS Resource, 2008, 2 pages.
FT Ultra LED Flex Arm Docklight Specification Sheet, APS Resource, Form APS 1168, Nov. 2009, 2 pages.
High Impact LED Dock Light Specification Sheet, APS Resource, Form APS1171, Nov. 2009, 2 pages.
International Search Report and Written Opinion for PCT/US2009/068306; Applicant: 4Front Engineered Solutions, Inc.; Date of Mailing: Mar. 10, 2010, 9 pages.
"Pentalift introduces industry's first solar powered dock leveler!" www.pentalift.com, Jun. 14, 2010, 1 page
Manual and Automatic Light Communication Systems, User's Manual, Serco, Oct. 2009, 28 pages.
Safety & Lighting Products Brochure, APS Source, Sep. 2004, 2 pages.
Smart Power Systems International BmbH, Web pages for Hybrid DC/AC Power Supply, Jun. 1, 2004.
Sunmotor International, Solar powered pumping system, Feb. 25, 2007.

* cited by examiner

ALTERNATIVE POWER OPERATION OF LOADING DOCKS AND LOADING DOCK EQUIPMENT

CROSS-REFERENCE TO RELATED APPLICATION

The present application is a U.S. National Phase under 35 U.S.C. 371 of International Application No. PCT/US2009/068306, filed Dec. 16, 2009, which claims the benefit of U.S. Provisional Application No. 61/138,282, filed Dec. 17, 2008, and U.S. Provisional Application No. 61/212,980, filed Apr. 17, 2009, the disclosures of which are incorporated herein by reference in their entireties.

TECHNICAL FIELD

The technology is generally directed to loading docks and loading dock equipment. More specifically, the technology is directed to the operation of loading dock equipment such as vehicle restraints, dock levelers, overhead doors/openers, barrier gates, lights, linked or unlinked control systems, and/or the like.

BACKGROUND

Warehouses typically include one or more loading docks for transferring goods/cargo to and from over-road trailers. Conventional loading docks usually consist of an opening in a side of the warehouse. The opening is usually positioned a few feet above the ground to be approximately level with shipping trailers. To load or unload goods, the doors on the aft end of the trailer are opened and the trailer is backed up to the loading dock opening. Workers can then pass into the trailer through the opening to load or unload goods.

The types of equipment utilized at loading docks can include one or more of vehicle restraints, dock levelers, overhead doors/openers, and/or linked or unlinked control systems. For example, an overhead door (e.g., roll-up door) may be employed to close off the opening when a trailer is not backed up to the loading dock. Likewise, a vehicle restraint may be employed to secure the trailer to the loading dock during loading and unloading and prevent premature departure, trailer creep, trailer walk, etc. In addition, dock levelers may be employed to interface the loading dock to the trailer, e.g., to adjust for trailer-dock gaps and/or differences between loading dock and trailer height.

In many instances, loading dock equipment includes electrical motors (e.g., stepper motors, linear drive motors, electrostatic motors, etc.), actuators, sensors, pumps, control systems, lights, and/or the like. In other instances, electrical power may also used to operate hydraulic and/or pneumatic equipment which may, in turn, be employed to operate the loading dock equipment. In the event of a failure, high cost, or unavailability of commercially provided electrical power, use of electrical loading dock equipment may be hampered, thus disrupting the flow of goods.

DETAILED DESCRIPTION

The following description provides specific details for a thorough understanding of, and enabling description for, various embodiments of the technology. One skilled in the art will understand that the technology may be practiced without many of these details. In some instances, well-known structures and functions have not been shown or described in detail to avoid unnecessarily obscuring the description of the embodiments of the technology. It is intended that the terminology used in the description presented below be interpreted in its broadest reasonable manner, even though it is being used in conjunction with a detailed description of certain embodiments of the technology. Although certain terms may be emphasized below, any terminology intended to be interpreted in any restricted manner will be overtly and specifically defined as such in this Detailed Description section.

Technology generally directed to operation of loading dock equipment such as vehicle restraints, dock levelers, overhead doors/openers, barrier gates, lights, and linked or unlinked control systems is disclosed herein. The disclosed technology may be employed to power electrical loading dock systems from batteries and/or alternative power sources, including "green" power sources. For example, the technology may be employed at new, temporary, and/or mobile facilities having any number of loading docks where reliable commercial power may not be readily available. Further, the technology may also be employed at warehouses in remote and/or developing areas where electrical infrastructure is not available and/or reasonably priced. The technology may be embodied as methods, apparatuses, manufactures (e.g., computer- and/or processor-readable storage and/or other mediums), and/or the like.

The technology also provides various benefits such as reducing the environmental impact and power costs of warehouse operations, generating income from the sale of excess power, and/or the like. Further, the technology may enable continued warehouse operations during commercial power black outs/brown outs. In addition, the technology may also enable warehouse operations while reducing infrastructure and installation requirements and associated costs.

Embodiments of the invention include a loading dock system having a small form factor modular backup battery installed in a control panel of the loading dock system. During a commercial power black out/brown out, the loading dock system may be operated from the backup battery. Another embodiment includes a loading dock system adapted to be powered from alternative power sources, e.g., solar power. Yet another embodiment includes a loading dock system adapted to be selectively powered from a commercial power source, an alternative power source, or a backup battery.

Figure 1:
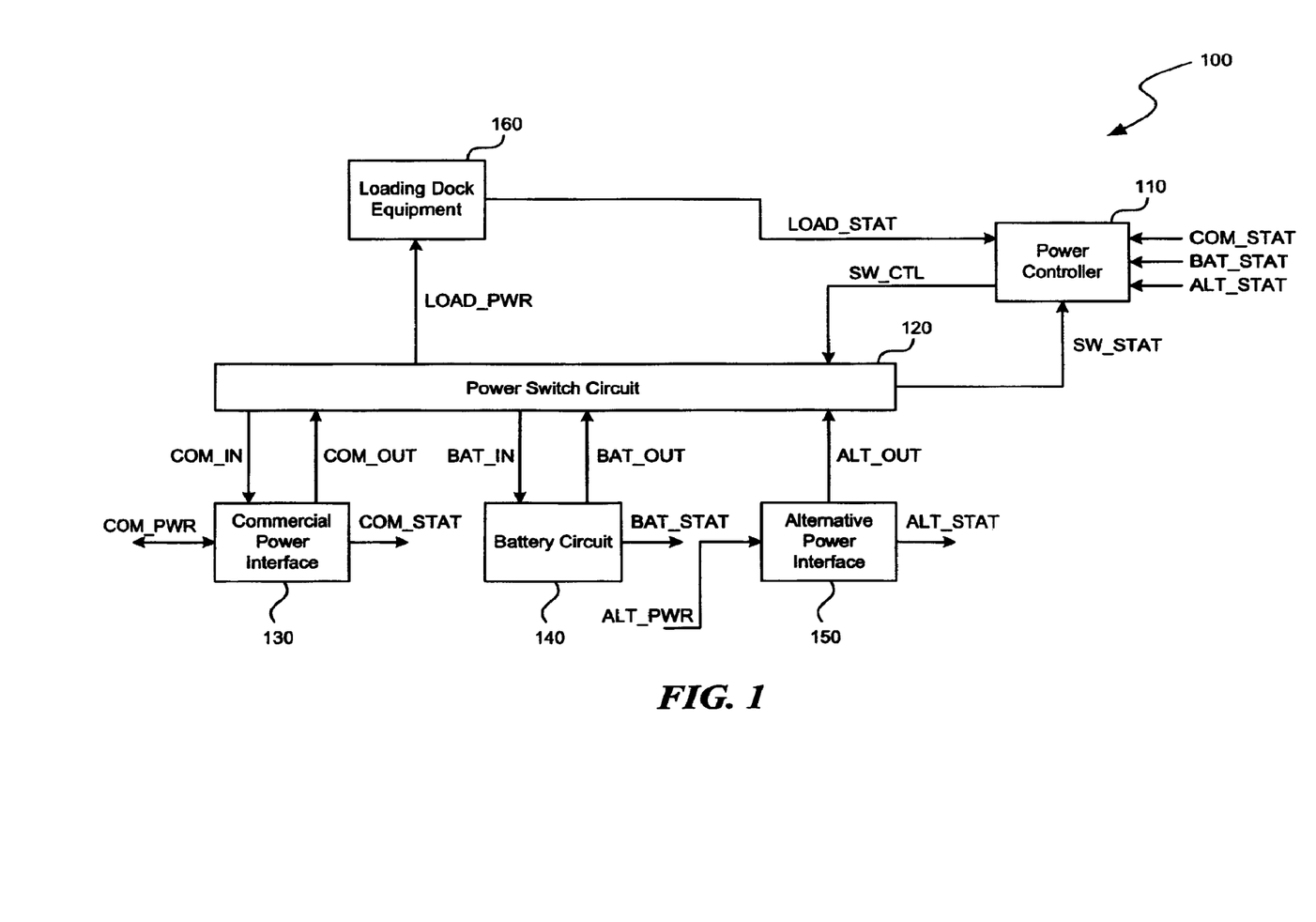
FIG. 1 is a block diagram of a loading dock system in accordance with an embodiment of the invention.

FIG. 1 is a block diagram of loading dock system 100 in which the invention may be practiced. As shown, system 100 includes power controller 110, power switch circuit 120, commercial power interface 130, battery circuit 140, alternative power interface 150, and loading dock equipment 160. Although system 100 is illustrated as including commercial power interface 130, battery circuit 140, and alternative power interface 150, one or more of these elements may be omitted in other embodiments; and in still other embodiments, additional elements may be included in system 100. In still further embodiments, the loading dock equipment 160 can be configured to selectively receive power provided by the alternative power interface 150, the battery circuit 140, and/or the commercial power interface 130.

Power controller 110 is configured to control the powering of loading dock equipment 160 via power switch circuit 120. As illustrated, power controller 110 is configured to receive status signals COM_STAT, BAT_STAT, ALT_STAT, SW_STAT, and LOAD_STAT and to provide output/control signal SW_CTL, as discussed below. In one embodiment, power controller 110 is configured to selectively switch and control operation of power switch circuit 120 based, at least in part, on the various status signal inputs. In addition, power controller 110 may be configured to be powered from power switch circuit 120 (not shown). The operation of power controller 110 is discussed in further detail with regards to FIG. 2.

Power switch circuit 120 is configured to selectively route power between and/or among commercial power interface 130, battery circuit 140, alternative power interface 150, and/or loading dock equipment 160. For example, power switch circuit 120 may be configured to selectively power loading dock equipment 160 from one of commercial power interface 130, battery circuit 140, and/or alternative power interface 150. Further, power switch circuit 120 may also be configured to provide power from battery circuit 140 and/or alternative power interface 150 to commercial power interface 130, e.g., to provide power to a commercial power grid. Likewise, power switch circuit 120 may also be configured to selectively provide power to alternative power interface 150 (not shown). In addition, power switch circuit 120 may be further configured to provide operational power to power controller 110 (not shown). The switching of power switch circuit 120 may be controlled by power controller 110 via control signal SW_CTL.

Power switch circuit 120 may include switching devices of any type (e.g., field-effect transistors, insulated gate bipolar transistors, junction field-effect transistors, bipolar-junction transistors, relays, transmission gates, etc.). In addition, power switch circuit 120 may also include rectifiers configured to convert alternating current (AC) power to direct current (DC) power and/or inverters configured to convert DC power to AC power. Likewise, power switch circuit 120 may include a battery charger configured to selectively charge battery circuit 140 from commercial power interface 130 and/or alternative power interface 150. For example, such a battery charger may include and/or be configured as a trickle charger, a constant current charger, a constant voltage charger, a constant current/constant voltage charger, a delta-V charger, and/or the like.

Power switch circuit 120 may also be configured to provide status signal SW_STAT to power controller 110 to, for example, indicate the status of rectifiers, inverters, chargers, switches, power source outputs, failure conditions (e.g., rectifier failure, inverter failure, switch failure, excessive current draw, out of range inputs/outputs, etc.), and/or the like. Status signal SW_STAT may be provided to power controller 110 to enable power controller 110 to adjust the operation of power switch circuit 120 based on these and other conditions. The types of signals provided to the power controller 110 can include, for example, serial communications via proprietary or open protocols, TCP/IP communications, and/or other suitable types of signals.

Commercial power interface 130 is configured to couple commercial power source COM_PWR to power switch circuit 120 via signals COM_IN and COM_OUT. Commercial power interface 130 may include a circuit breaker, line filter, surge protector, power meter, and/or the like. However, in one embodiment, commercial power interface 130 may simply be a wire segment connecting commercial power source COM_PWR to power switch circuit 120. For typical embodiments, commercial power source COM_PWR is provided by a public utility, e.g., from the power grid, as an AC power source. However, in other embodiments, commercial power source COM_PWR may be provided from other sources and may, for example, be provided as DC power. Further, commercial power interface 130 may be configured to provide status information regarding commercial power source COM_PWR or commercial power interface 130 to power controller 110 via signal COM_STAT. Status information may include, for example, an availability of power, a voltage, a current, power pricing data, and/or the like.

Battery circuit 140 is configured to store power that is provided by commercial power interface 130 or alternative power interface 150 via signal BAT_IN and to selectively provide power to loading dock equipment 160 via signal BAT_OUT. Battery circuit 140 may include any number of batteries arranged in any combination of series configurations, parallel configurations, and/or series and parallel configurations. In one embodiment, battery circuit 140 includes absorbed glass mat (AGM), gel cell, or other deep cycle batteries. However, other batteries and/or energy storage devices such as flooded lead-acid batteries, nickel-metal-hydride batteries, nickel-cadmium batteries, lithium-ion batteries, lithium-polymer batteries, alkaline batteries, capacitors, and/or the like, may also be suitably employed. While battery circuit 140 is illustrated as being coupled to power switch circuit 120 by signals BAT_IN and BAT_OUT, in other embodiments, signals BAT_IN and BAT_OUT may be a single signal.

Battery circuit 140 may include integral, permanently installed, semi-permanently installed, modular, and/or removable batteries. For example, battery circuit 140 may be adapted to include a modular battery pack interface and/or a modular battery pack. For example, a modular battery pack may include relatively small battery packs designed for use with handheld power tools such as cordless drills, saws, routers, and/or the like. Such battery packs may have a relatively small form factor and be suitable for installation within a loading dock control panel. However, other battery packs may be suitable for installation at other locations. Likewise, these battery packs may be capable of providing sufficient power to operate loading dock equipment 160. As an example, 12-volt, 18-volt, 24-volt, and/or similar battery packs may be suitably employed. For example, use of such battery circuits providing less than 48 volts may simplify compliance with relevant regulations and/or certifications. With this example, battery circuit 140 may be sized to provide a current in the order of 10- to 20-amps for tens of seconds, approximately ten times a day. However, other battery circuits may be sized (e.g., energy storage capacity, physical size, and/or form factor) for any voltage, current, or load requirements.

Further, battery circuit 140 may configured to provide status signal BAT_STAT to power controller 110. For example, status signal BAT_STAT may be employed to indicate the output voltage of battery circuit 140, a voltage of each individual battery, and/or the like. Also, status signal BAT_STAT may include multiple signals and be provided on one or more signal lines. Power controller 110 may be configured to determine a failure condition or approximate a charge percentage for battery circuit 140, and/or the like, from status signal BAT_STAT.

Alternative power interface 150 is configured to selectively power loading dock equipment 160 and/or charge battery circuit 140 via power switch circuit 120. The output of alternative power interface 150 is provided to power switch circuit 120 via signal ALT_OUT. Further, alternative power interface 150 may be configured to provide status signal ALT_STAT to power controller 110 to indicate a status of alternative power interface 150.

As shown, alternative power interface 150 is adapted to interface with one or more alternative power sources. Alternative power interface 150 may also be configured to select an alternative power source from multiple alternate power sources, e.g., based on power pricing data, cost, availability, and/or the like. Alternative power sources may include photovoltaic power sources (e.g., solar panels or arrays), wind power sources, geothermal power sources, fuel cells, bioreactors, and/or the like. For typical embodiments, alternative power interface 150 receives DC power from an alternate power source via alternate power source ALT_PWR. However, in other embodiments, alternate power source ALT_PWR may be provided from other sources and may, for example, be provided as AC power. Likewise, alternate power sources may be included within, instead of interfaced to, alternative power interface 150.

Loading dock equipment 160 typically includes one or more vehicle restraints, dock levelers, overhead doors/openers, linked or unlinked control systems, barrier gates, lights, and/or any other equipment suitable for use at a loading dock. Additional examples of loading dock equipment are discussed below. Moreover, loading dock equipment 160 may include loading dock equipment for one loading dock bay or for multiple loading dock bays. As one example, one battery circuit and/or alternative power interface may be provided for each piece of loading dock equipment. However, one battery circuit and/or alternative power interface may also be employed to power multiple pieces of loading dock equipment (for either a single loading dock or for multiple loading docks), multiple battery circuits and/or alternative power interfaces may be provided, and/or the like.

In one embodiment, loading dock equipment 160 includes electrically powered vehicle restraints and dock levelers while including manually actuated overhead doors (e.g., held up by counterweights, torsion springs, etc.). In other embodiments, loading dock equipment 160 includes electrically powered vehicle restraints, dock levelers, and overhead doors/openers. As shown, loading dock equipment 160 is powered from power switch circuit 120 via signal LOAD_PWR and is configured to provide status signal LOAD_STAT to indicate a status such as equipment status, failure conditions, power consumption data, and/or the like. Suitable examples of loading dock equipment are available from 4Front Engineered Solutions, Inc., of Carrollton, Tex. Additional examples of loading dock equipment may be as described by U.S. Pat. No. 7,256,703, entitled "Zone Specific Remote Control Panel for Loading Dock Equipment" to K. Duvernell et al., which is hereby incorporated by reference.

In other embodiments, other systems may differ from system 100 of FIG. 1. For example, various control signals, status signals, input signals, output signals, power sources, and/or the like, may be omitted. Likewise, certain embodiments may omit battery circuit 140 and be configured to selectively power loading dock equipment 160 from commercial power interface 130 or alternative power interface 150. Likewise, other embodiments may omit alternative power interface 150 and be configured to selectively power loading dock equipment 160 from commercial power interface 130 or battery circuit 140. Yet other embodiments may omit commercial power interface 130 and be configured to selectively power loading dock equipment 160 from battery circuit 140 or alternative power interface 150. As those of ordinary skill in the art will appreciate, embodiments of the present invention are not limited to the particular types of loading dock equipment depicted in the figures and/or described herein, but extend to other types of loading dock equipment known in the art. These and other variations are within the spirit and scope of the invention.

Figure 2:
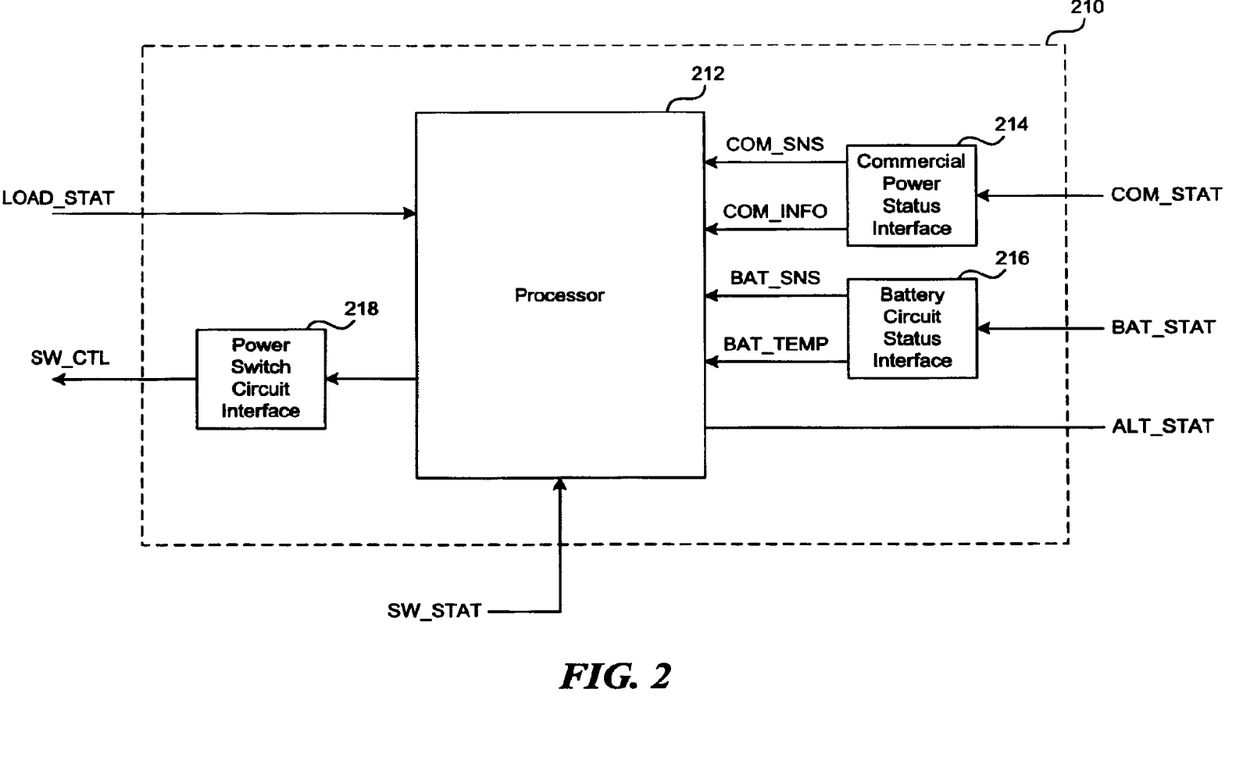
FIG. 2 is a block diagram of a power controller usable in the loading dock system of FIG. 1 in accordance with an embodiment of the invention.

FIG. 2 is a block diagram of power controller 210. Power controller 210 includes processor 212, commercial power status interface 214, battery circuit status interface 216, and power switch circuit interface 218. Power controller 210 may be employed as an embodiment of power controller 110 of FIG. 1.

As illustrated, processor 212 is configured to control the operations of power switch circuit 120 (e.g., via control signal SW_CTL). In one embodiment, processor 212 is configured to selectively control power switch circuit 120 based on the status of commercial power source COM_PWR, alternative power source ALT_PWR, and/or battery circuit 140. For example, processor 212 may provide power from commercial power source COM_PWR if power from alternative power source ALT_PWR or battery circuit 140 is not available. Likewise, processor 212 may provide power from alternative power source ALT_PWR if power from commercial power source COM_PWR is not available, if there is a failure in battery circuit 140, if processor 212 is in reset, and/or the like. Further, processor 212 may provide power from alternative power source ALT_PWR or battery circuit 140 to commercial power source COM_PWR based on power pricing data, excess availability, and/or the like. For example, processor 212 may enable an alternative power source to provide power to commercial power source COM_PWR if power pricing data indicates that the provided power can be sold for more than the cost of generating the power.

To determine these and other conditions, processor 212 may receive various status signals as illustrated in FIG. 2. For example, signals COM_STAT, BAT_STAT, ALT_STAT, SW_STAT, and LOAD_STAT may be employed to respectively represent the status of commercial power interface 130, battery circuit 140, alternative power interface 150, power switch circuit 120, and loading dock equipment 160.

Processor 212 may also be configured to receive configuration and/or other operating information from switches (e.g., DIP switches), pull-up resistors, pull-down resistors, jumpers, proximity sensors, eye switches, data interfaces, manual selection/override switches, and/or the like. The configuration and/or other operating information may be employed to modify the control of power switch circuit 120 (e.g., alter power source selection, disable delivery of power to loading dock equipment 160, provide power to commercial power source COM_PWR, etc.). Alternatively, configuration and/or other operating information may be read by processor 212 from a memory or may be received from another processor.

Processor 212 may be a programmable logic controller (PLC), a microprocessor, a microcontroller, a digital signal processor (DSP), and/or the like. However, in other embodiments, digital logic, analog logic, combinations of digital logic and analog logic, and/or the like, may also be employed instead of a processor. For example, such embodiments may be implemented in a field-programmable gate array (FPGA), in an application-specific integrated circuit (ASIC), in other programmable logic devices (PLDs), and/or the like.

Commercial power status interface 214 may be configured to interface commercial power interface 130 to processor 212. For example, commercial power status interface 214 may receive signal COM_STAT from commercial power interface 130 and provide discrete signals COM_SNS and COM_INFO to processor 212. For this example, signal COM_SNS may be employed to indicate a voltage of commercial power interface 130 while signal COM_INFO is employed to communicate additional information to processor 212. Commercial power status interface 214 may also be configured to provide any other suitable signals to processor 212.

Battery circuit status interface 216 may be configured to interface battery circuit 140 to processor 212. For example, battery circuit status interface 216 may receive signal BAT_STAT from battery circuit 140 and provide discrete signals BAT_SNS and BAT_TEMP to processor 212. For this example, signal BAT_SNS may be employed to indicate a voltage of battery circuit 140 while signal BAT_TEMP may be employed to indicate a temperature of battery circuit 140. However, battery circuit status interface 216 may also be configured to provide any other suitable signals to processor 212.

Each of commercial power status interface 214 and battery circuit status interface 216 may include interface circuitry such as analog-to-digital converters, digital-to-analog converters, multiplexers, drivers, buffers, logic gates, analog circuits, and/or the like.

Processor 212 is further configured to receive status signals ALT_STAT, SW_STAT, and LOAD_STAT, as discussed above. While these signals are illustrated as directly connected to processor 212, interface circuits similar to commercial power status interface 214 and/or battery circuit status interface 216 may also be included.

Power switch circuit interface 218 may be included to interface processor 212 to power switch circuit 120. In one embodiment, power switch circuit interface 218 includes a relay, a level-shifter, a driver, a buffer, an inverter, logic gates, and/or the like configured to provide control signal SW_CTL based on the output of processor 212.

Figure 3:
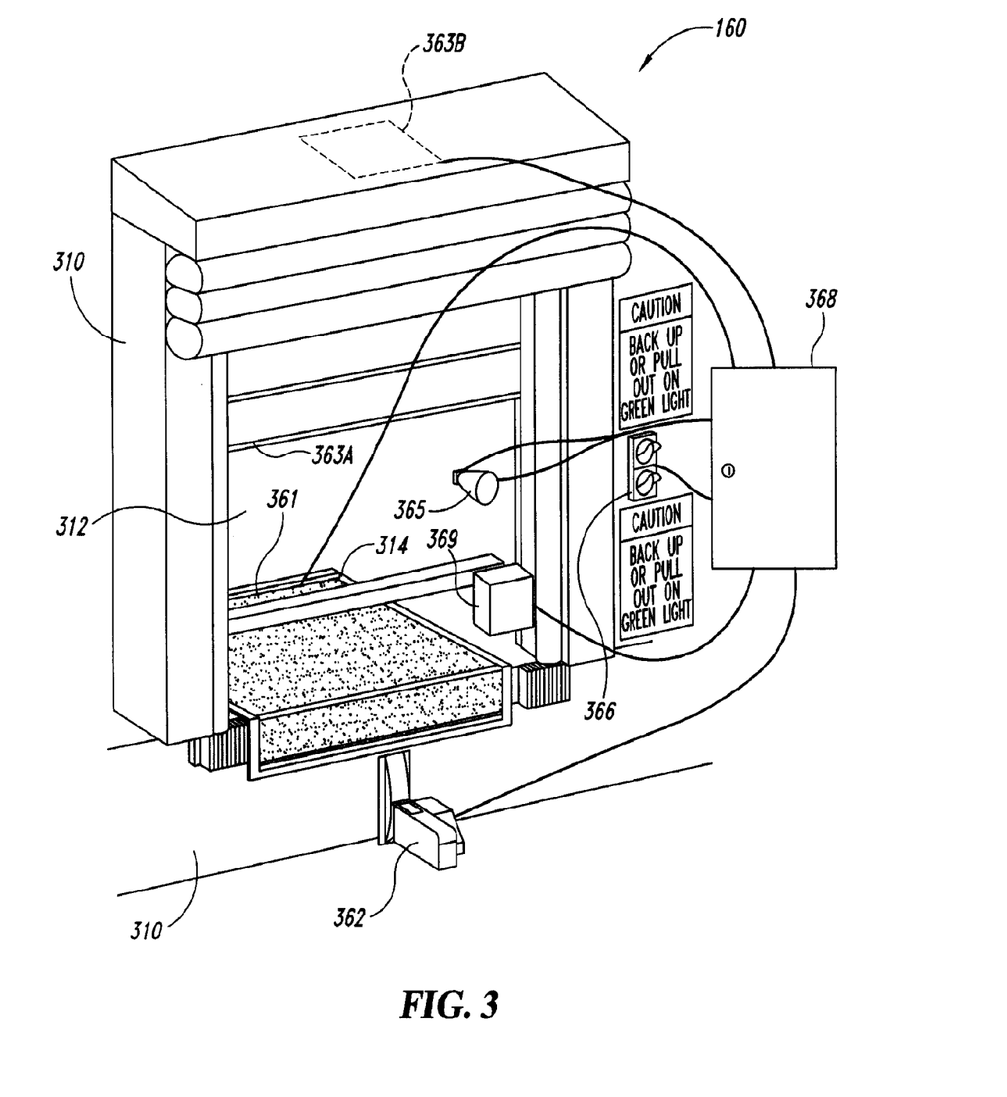
FIG. 3 is a perspective view of a loading dock configured in accordance with an embodiment of the invention.

FIG. 3 is a perspective view of loading dock equipment 300 around an opening 312 in a warehouse or other building 310. Opening 312 can be at least generally similar to a conventional trailer truck opening having a width of approximately 10 feet and a height of approximately 10.5 feet. In other embodiments, however, opening 312 may have different dimensions. A vehicle (e.g., a truck and shipping trailer) may be backed into loading dock 300.

In this example, loading dock equipment 300 includes dock leveler 361 configured to provide an adjustable height path or bridge between floor 314 of building 310 and a trailer bed of a vehicle. Loading dock equipment 300 further includes vehicle restraint 362 configured to engage, for example, a rear impact guard of the vehicle. In addition, loading dock equipment 300 includes overhead door 363A and associated opener 363B, barrier gate 364, loading light 365, and indication lights 366.

As shown in FIG. 3, control panel 368 is coupled to each of dock leveler 361, vehicle restraint 362, overhead door 363A/opener 363B, barrier gate 364, loading light 365, and indication lights 366. Control panel 368 may include, for example, power controller 110, power switch circuit 120, commercial power interface 130, battery circuit 140, and alternative power interface 150. Further, control panel 368 may be configured to control and/or provide power to dock leveler 361, vehicle restraint 362, overhead door 363A/opener 363B, barrier gate 364, loading light 365, and indication lights 366, as discussed above. However, in other embodiments, only certain elements of loading dock equipment 300 may be configured to be controlled and/or powered from control panel 368. Likewise, a single control panel, or components thereof, may be employed to control equipment at a single loading dock or at multiple loading docks, or multiple control panels, or components thereof, may be employed to control equipment at multiple loading docks or at a single loading dock.

Further, loading lights 365 may include lights mounted on booms, lights mounted on flexible arms, ceiling mounted lights, wall mounted lights, floor mounted lights, trailer mounted lights, portable lights, and/or the like. Loading lights 365 may also include light emitting diode (LED) lights, incandescent lights, florescent lights, sodium halide lights, electroluminescent lights, and/or the like. Suitable examples of loading lights 365 include the FT Ultra LED™ Dock Light, the FT Ultra™ Dock Light, the E-Saver™ LED Lamp, the High Impact LED Dock Light™, and the Dock Strobe™, all of which are available from 4Front Engineered Solutions, Inc., of Carrollton, Tex.

In addition, indication lights 366 may include lights configured to indicate operations of loading dock equipment 300. For example, indication lights 266 may be configured to indicate a status of the loading dock, a status of a trailer, a status of other loading dock equipment, and/or the like to persons inside or outside of the warehouse. As one example, indication lights 366 include lights mounted on the exterior of the warehouse that are configured to indicate a loading or unloading status of a trailer to a truck driver. As another example, indication lights 366 include lights within the warehouse that are configured to indicate a status to workers within the warehouse or within the trailer. Such lights may be on control panel 368 or any other suitable structure. Suitable examples of indication lights 366 include the APS&GO™ Communications System, and the Dock Strobe™, which are both available from 4Front Engineered Solutions, Inc., of Carrollton, Tex.

As yet other examples, loading dock equipment 300 may also include ventilation and/or temperature control equipment configured to operate on a trailer and/or a loading dock area. For example, equipment such as fans, air conditioning units, heaters, humidifiers, dehumidifiers, and/or the like may be suitably employed as loading dock equipment. As one example, the HV™ High Velocity Air Exchange Fan, available from 4Front Engineered Solutions, Inc., of Carrollton, Tex., may be employed as loading dock equipment.

LIST OF FURTHER EMBODIMENTS

1. A loading dock system for transferring cargo between a warehouse or other building and a vehicle using loading dock equipment, the loading dock system comprising:
   an alternative power interface configured to receive power from at least one alternative power source;
   a battery circuit configured to store power provided by at least one of a commercial power interface and the alternative power interface; and
   a power switch circuit configured to selectively route power to the loading dock equipment from the alternative power interface and the battery circuit.

2. The loading dock system of embodiment 1 wherein the at least one alternative power source includes at least one of a photovoltaic power source, a geothermal power source, a wind power source and a bioreactor.

3. The loading dock system of embodiments 1 or 2, further comprising:
   a power controller configured to selectively control switching operations of the power switch circuit based on the availability of power from the alternative power source and the availability of power from the battery circuit.

4. The loading dock system of embodiment 3 wherein the power switch circuit is further configured to selectively route power to loading dock equipment of multiple loading docks.

5. The loading dock system of embodiment 3 or 4 wherein the power controller includes:
   a processor configured to control the operations of the power switch circuit;
   a battery circuit status interface configured to interface the battery circuit to the processor; and
   a power switch circuit interface configured to interface the processor to the power switch circuit.

6. The loading dock system of embodiment 5 wherein the power switch circuit includes:
   field-effect transistors, insulated gate bipolar transistors, junction field-effect transistors, bipolar-junction transistors, relays, or transmission gates that are configured to switch power;
   rectifiers configured to convert alternating current (AC) power to direct current (DC) power or inverters configured to convert DC power to AC power; and
   a battery charger configured to selectively charge the battery circuit from the commercial power interface or from the alternative power interface.

7. The loading dock system of embodiment 6 wherein the battery charger is configured as a constant current/constant voltage charger or as a delta-V charger.

8. The loading dock system of embodiment 5 or 6 wherein the processor is a programmable logic controller (PLC).

9. The loading dock system of one of embodiments 5 to 8 wherein the power controller is further configured to provide power to the loading dock equipment from the alternative power source if the processor is in reset.

10. The loading dock system of one of embodiments 3 to 9 wherein the power controller is further configured to provide power to a commercial power source if power pricing data indicates that power can be sold for more than a cost of generating the power.

11. The loading dock system of one of embodiments 1 to 10, further comprising:
   the commercial power interface, wherein the commercial power interface is configured to receive power from a commercial power source, and the power switch circuit is further configured to selectively route power between the battery circuit, the alternative power interface, the commercial power interface, and the loading dock equipment.

12. The loading dock system of embodiment 11 wherein the commercial power interface is a wire segment connecting the commercial power source to a power switch circuit.

13. The loading dock system of embodiment 11 wherein the commercial power interface is further configured to receive direct current (DC) power from the commercial power source.

14. The loading dock system of one of embodiments 1 to 13 wherein the battery circuit includes a modular battery pack interface configured to interface a handheld power tool battery to a power switch circuit.

15. The loading dock system of one of embodiments 1 to 14 wherein the alternative power interface is further configured to interface with at least one of a geothermal power source and a photovoltaic power source.

16. The loading dock system of one of embodiments 1 to 15 wherein the alternative power interface is further configured to interface with a bioreactor.

17. The loading dock system of one of embodiments 1 to 16 wherein the loading dock equipment includes at least one of:
   a dock leveler configured to provide an adjustable height path between a bed of a trailer truck and a floor of the warehouse; and
   a vehicle restraint configured to selectively secure the trailer truck relative to the warehouse.

18. The loading dock system of one of embodiments 1 to 17 wherein the loading dock equipment includes one or more lights.

19. The loading dock system of one of embodiments 1 to 18 wherein the loading dock equipment includes one or more indication lights associated with operation of the loading dock equipment.

20. The system of one of embodiments 3 to 10, wherein the power controller is configured to control loading dock equipment of multiple loading docks at a temporary or mobile facility that does not have commercial electrical service.

21. A method of operating a loading dock suitable for transferring cargo between a vehicle and a warehouse or other building, the method comprising:
   receiving power from a battery circuit;
   receiving power from an alternative power source;
   selectively switching power from one of the battery circuit or the alternative power source to loading dock equipment based on an availability of power from the alternative power source; and
   operating the loading dock equipment from the switched power.

22. The method of embodiment 21, the method further comprising:
   receiving power from a commercial power source, wherein the selectively switching power further includes selectively switching power from one of the commercial power source, the battery circuit, or the alternative power source to loading dock equipment.

23. The method of embodiment 22, wherein the selectively switching power is further based on an availability of power from the commercial power source.

24. The method of one of embodiments 21 to 23, further comprising:
   selectively switching power from the alternative power source to the commercial power source based on power pricing data or excess power availability data.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the term "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number, respectively. The word "or," in reference to a list of two or more items, covers all of the following interpretations of the word: any of the items in the list, all of the items in the list, and any combination of the items in the list.

The above detailed description of embodiments of the system is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative combinations or subcombinations. Each of these processes or blocks may be implemented in a variety of different ways. Also, while processes or blocks are at times shown as being performed in series, these processes or blocks may instead be performed in parallel, or may be performed at different times. Further, any specific numbers noted herein are only examples: alternative implementations may employ differing values or ranges.

From the foregoing, it will be appreciated that specific embodiments of the invention have been described herein for purposes of illustration, but that various modifications may be made without deviating from the spirit and scope of the invention.

We claim:

1. A loading dock system for transferring cargo between a warehouse and a vehicle, the loading dock system comprising:
   an alternative power interface configured to receive power from at least one alternative power source;
   a battery circuit configured to store power provided by the alternative power interface;
   loading dock equipment configured to, at a first time, receive power provided by the battery circuit and, at a second time different from the first time, receive power provided by a commercial power interface;
   a power switch circuit configured to selectively route power to the loading dock equipment from the battery circuit at the first time and selectively route power to the loading dock equipment from the commercial power interface at the second time; and
   a power controller configured to selectively control switching operations of the power switch circuit;
   wherein the power switch is further configured to selectively route power to the loading dock equipment based on a switch control signal from the power controller to the power switch, and wherein the switch control signal is based on a status signal provided to the power controller from the loading dock equipment.

2. The loading dock system of claim 1 wherein the at least one alternative power source includes at least one of a photovoltaic power source, a geothermal power source, and a wind power source.

3. A loading dock system for transferring cargo between a warehouse and a vehicle, the loading dock system comprising:
   an alternative power interface configured to receive power from at least one alternative power source;
   a battery circuit configured to store power provided by at least one of a commercial power interface and the alternative power interface;
   loading dock equipment of multiple loading docks configured to selectively receive power provided by at least one of the alternative power interface and the battery circuit;
   a power switch circuit configured to selectively route power to the loading dock equipment of multiple loading docks from the alternative power interface and the battery circuit; and
   a power controller configured to selectively control switching operations of the power switch circuit.

4. The loading dock system of claim 1 wherein the power controller includes:
   a processor configured to control the operations of the power switch circuit;
   a battery circuit status interface configured to interface the battery circuit to the processor; and
   a power switch circuit interface configured to interface the processor to the power switch circuit.

5. The loading dock system of claim 4 wherein the power switch circuit includes:
   field-effect transistors, insulated gate bipolar transistors, junction field-effect transistors, bipolar-junction transistors, relays, or transmission gates that are configured to switch power; and
   rectifiers configured to convert alternating current (AC) power to direct current (DC) power or inverters configured to convert DC power to AC power; and
   a battery charger configured to selectively charge the battery circuit from the commercial power interface or from the alternative power interface.

6. The loading dock system of claim 5 wherein the battery charger is configured as a constant current/constant voltage charger or as a delta-V charger.

7. The loading dock system of claim 4 wherein the processor is a programmable logic controller (PLC).

8. The loading dock system of claim 4 wherein the power controller is further configured to provide power to the loading dock equipment from the alternative power source if the processor is in reset.

9. The loading dock system of claim 1 wherein the power controller is further configured to provide power to a commercial power source if power pricing data indicates that power can be sold for more than a cost of generating the power.

10. The loading dock system of claim 1, further comprising:
    the commercial power interface, wherein the commercial power interface is configured to receive power from a commercial power source.

11. The loading dock system of claim 10 wherein the commercial power interface is a wire segment connecting the commercial power source to a power switch circuit.

12. The loading dock system of claim 10 wherein the commercial power interface is further configured to receive direct current (DC) power from the commercial power source.

13. The loading dock system of claim 1 wherein the battery circuit includes a modular battery pack interface configured to interface a handheld power tool battery to a power switch circuit.

14. The loading dock system of claim 1 wherein the alternative power interface is further configured to interface with at least one of a geothermal power source and a photovoltaic power source.

15. The loading dock system of claim 1 wherein the alternative power interface is further configured to interface with a bioreactor.

16. The loading dock system of claim 1 wherein the loading dock equipment includes at least one of:
    a dock leveler configured to provide an adjustable height path between a bed of a trailer truck and a floor of the warehouse; and
    a vehicle restraint configured to selectively secure the trailer truck relative to the warehouse.

17. The loading dock system of claim 1 wherein the loading dock equipment includes one or more lights.

18. The loading dock system of claim 1 wherein the loading dock equipment includes one or more indication lights associated with operation of the loading dock equipment.

19. A system for operating loading dock equipment suitable for transferring cargo between a vehicle and a warehouse, the system comprising:
at least one alternative power source;
an alternative power interface coupled to the at least one alternative power source;
a battery circuit coupled to the alternative power interface and configured to store power provided by the alternative power interface, wherein the alternative power interface is configured to selectively provide power to the battery circuit;
a power switch circuit configured to selectively route power between the battery circuit, the alternative power interface, and the loading dock equipment;
a power controller configured to selectively control switching operations of the power switch circuit by providing a switch control signal to the power switch circuit, wherein the switch control signal is based on a status signal provided to the power controller from the loading dock equipment; and
a commercial power interface configured to couple power from a commercial source to the power switch circuit, wherein the power switch circuit is further configured to selectively route power between the battery circuit, the alternative power interface, the commercial power interface, and the loading dock equipment.

20. The system of claim 19, wherein the power controller is configured to control loading dock equipment of multiple loading docks at a temporary or mobile facility.

21. A method of operating a loading dock suitable for transferring cargo between a trailer and a warehouse, the method comprising:
receiving power from an alternative power source;
providing, via a power switch circuit, power from the alternative power source to a battery circuit;
receiving, by a power controller, a status signal from loading dock equipment;
selectively providing, by the power switch circuit, power to the loading dock equipment from either the alternative power source or the battery circuit based on the status signal; and
operating the loading dock equipment from the provided power.

22. The method of claim 21, the method further comprising:
receiving power from a commercial power source, wherein the selectively switching power further includes selectively switching power from the commercial power source to the loading dock equipment or selectively switching power from the commercial power source to the battery circuit;
wherein the status signal from the loading dock equipment is based on settings of the loading dock equipment configured at the loading dock equipment with one or more of: a DIP switch, a pull-up resistor, a pull-down resistor, a jumper, a proximity sensor, an eye switch, and a manual selection switch.

23. The method of claim 22, wherein the selectively switching power is further based on an availability of power from the commercial power source.

24. The method of claim 22, further comprising:
selectively switching power from the alternative power source to the commercial power source based on power pricing data or excess power availability data.

25. A system for operating a loading dock, the system comprising:
means for receiving power from a battery circuit;
means for receiving power from an alternative power source;
means for providing power from the alternative power source to a battery circuit;
means for receiving, by a power controller, a status signal from loading dock equipment;
selectively providing, by the power switch circuit, power to the loading dock equipment from either the alternative power source or the battery circuit based on the status signal; and
means for operating the loading dock equipment from the provided power.

26. The system of claim 25, wherein the system further comprises:
means for receiving power from a commercial power source; and
means for selectively switching power from the commercial power source to the loading dock equipment.

27. A loading dock system for transferring cargo between a warehouse and a vehicle, the loading dock system comprising:
an alternative power interface configured to receive power from at least one alternative power source;
a battery circuit configured to store power received from the alternative power interface;
loading dock equipment configured to receive power from the battery circuit;
a power controller; and
a power switch circuit operably coupled to the power controller, wherein the power switch circuit is configured to selectively provide power from the battery circuit to the loading dock equipment based on a switch control signal received from the power controller, and wherein the switch control signal is based on a status signal received by the power controller from the loading dock equipment.

28. The loading dock system of claim 27 wherein the at least one alternative power source includes at least one of a photovoltaic power source, a geothermal power source, and a wind power source.

29. The loading dock system of claim 27 wherein:
the power switch circuit is further configured to selectively route power to loading dock equipment of multiple loading docks based on the switch control signal; and
the status signal from the loading dock equipment is based on settings of the loading dock equipment configured at the loading dock equipment with one or more of: a DIP switch, a pull-up resistor, a pull-down resistor, a jumper, a proximity sensor, an eye switch, and a manual selection switch.

30. The loading dock system of claim 1 wherein the status signal indicates one or more of loading dock failure conditions or loading dock power consumption data.

31. The system for operating loading dock equipment of claim 19 wherein the status signal indicates one or more of loading dock failure conditions or loading dock power consumption data.

* * * * *